US009549059B2

(12) United States Patent
Ross et al.

(10) Patent No.: US 9,549,059 B2
(45) Date of Patent: Jan. 17, 2017

(54) OFFERING MENU ITEMS TO A USER

(75) Inventors: Andree Ross, Lüdinghausen (DE); Wolfgang Theimer, Bochum (DE)

(73) Assignee: Nokia Technologies Oy, Espoo (FI)

( * ) Notice: Subject to any disclaimer, the term of this patent is extended or adjusted under 35 U.S.C. 154(b) by 455 days.

(21) Appl. No.: 13/367,110

(22) Filed: Feb. 6, 2012

(65) Prior Publication Data

US 2012/0200607 A1 Aug. 9, 2012

Related U.S. Application Data

(63) Continuation of application No. 11/885,704, filed as application No. PCT/IB2005/000552 on Mar. 4, 2005, now Pat. No. 8,136,038.

(51) Int. Cl.
*G06T 13/40* (2011.01)
*G06F 3/0484* (2013.01)
(Continued)

(52) U.S. Cl.
CPC ........ *H04M 1/72583* (2013.01); *G06F 3/0482* (2013.01); *G06F 3/04815* (2013.01); *H04M 1/72544* (2013.01); *A63F 2300/308* (2013.01); *A63F 2300/406* (2013.01); *A63F 2300/5553* (2013.01); *H04M 1/72569* (2013.01); *H04M 2250/12* (2013.01)

(58) Field of Classification Search
CPC ........ G06T 13/40; A63F 13/00; A63F 13/112; H04N 7/157; G06F 3/04815
See application file for complete search history.

(56) References Cited

U.S. PATENT DOCUMENTS 5,802,296 A * 9/1998 Morse ....................... G06F 3/14
345/7
5,956,038 A * 9/1999 Rekimoto ..................... 345/419
(Continued)

FOREIGN PATENT DOCUMENTS

EP 1386984 A1 3/2004
JP 11-184790 A 7/1999
(Continued)

OTHER PUBLICATIONS

"Bandai America Announces the Next Generation Tamagotchi" Tamagotchi Connection; http://www.bandai.com/news/news.cfm?wn_id=71; posted on Jun. 15, 2004, printed from internet on Jul. 30, 2007.
(Continued)

*Primary Examiner* — Tadeese Hailu
(74) *Attorney, Agent, or Firm* — Ditthavong & Steiner, P.C.

(57) ABSTRACT

The invention relates to an electronic device offering a plurality of menu items to a user. In order to enable a user friendly selection of the menu items, the electronic device comprises a screen, user input means, storing means adapted to store parameters for a virtual model of a user and processing means. The processing means are adapted to generate a visual representation of a virtual user model on the screen based on the stored parameters for the virtual model of a user, to cause a movement of a visually represented virtual user model depending on a user input, to detect a movement of a visually represented virtual user model that is associated to a particular menu item, and to call a function that is assigned to the particular menu item.

20 Claims, 3 Drawing Sheets

(51) Int. Cl.
*H04M 1/725* (2006.01)
*G06F 3/0481* (2013.01)
*G06F 3/0482* (2013.01)

(56) References Cited

U.S. PATENT DOCUMENTS

| | | | |
|---|---|---|---|
| 5,982,372 A | 11/1999 | Brush, II et al. | |
| 6,002,401 A | 12/1999 | Baker | |
| 6,091,956 A * | 7/2000 | Hollenberg | 455/456.5 |
| 6,166,732 A * | 12/2000 | Mitchell | G06F 9/465 |
| | | | 715/733 |
| 6,166,744 A * | 12/2000 | Jaszlics | G06T 17/00 |
| | | | 345/421 |
| 6,187,979 B1 | 2/2001 | Ido et al. | |
| 6,215,498 B1 * | 4/2001 | Filo | G06F 3/011 |
| | | | 345/419 |
| 6,329,986 B1 * | 12/2001 | Cheng | G06F 3/011 |
| | | | 345/419 |
| 6,349,301 B1 * | 2/2002 | Mitchell | A63F 13/12 |
| 6,366,285 B1 | 4/2002 | Brush, II et al. | |
| 6,545,682 B1 * | 4/2003 | Ventrella | G06T 17/00 |
| | | | 345/473 |
| 6,587,835 B1 * | 7/2003 | Treyz et al. | 705/14.64 |
| 6,767,287 B1 * | 7/2004 | Mcquaid et al. | 463/42 |
| 6,772,195 B1 * | 8/2004 | Hatlelid | G06F 3/04815 |
| | | | 345/419 |
| 6,868,337 B2 * | 3/2005 | Muramatsu | 701/431 |
| 6,910,186 B2 * | 6/2005 | Kim | 715/706 |
| 6,933,938 B1 * | 8/2005 | Matsuda | A63F 13/12 |
| | | | 345/419 |
| 7,027,055 B2 * | 4/2006 | Anderson | G06F 11/328 |
| | | | 345/473 |
| 7,250,944 B2 * | 7/2007 | Anderson | G06F 11/328 |
| | | | 345/419 |
| 7,386,799 B1 * | 6/2008 | Clanton | A63F 13/12 |
| | | | 715/753 |
| 7,958,047 B2 * | 6/2011 | Jung | G06Q 20/10 |
| | | | 705/35 |
| 8,612,196 B2 * | 12/2013 | Rosedale | G06F 17/5009 |
| | | | 345/419 |
| 2001/0034661 A1 * | 10/2001 | Ferreira | 705/26 |
| 2002/0140732 A1 * | 10/2002 | Tveskov | G09B 19/04 |
| | | | 715/763 |
| 2002/0173906 A1 * | 11/2002 | Muramatsu | 701/207 |
| 2003/0003988 A1 * | 1/2003 | Walker | G06Q 30/02 |
| | | | 463/21 |
| 2003/0005439 A1 | 1/2003 | Rovira | |
| 2003/0128205 A1 | 7/2003 | Varghese | |
| 2003/0191608 A1 * | 10/2003 | Anderson | G06F 11/328 |
| | | | 702/189 |
| 2004/0024846 A1 * | 2/2004 | Randall | H04L 67/04 |
| | | | 709/219 |
| 2004/0054428 A1 * | 3/2004 | Sheha et al. | 700/56 |
| 2004/0254019 A1 * | 12/2004 | Riendeau | A63F 3/081 |
| | | | 463/42 |
| 2005/0022134 A1 | 1/2005 | Tokashiki | |
| 2005/0137015 A1 * | 6/2005 | Rogers | A63F 13/12 |
| | | | 463/42 |
| 2005/0256782 A1 * | 11/2005 | Sands | G06Q 10/087 |
| | | | 705/26.41 |
| 2005/0289236 A1 * | 12/2005 | Hull et al. | 709/231 |
| 2006/0015254 A1 * | 1/2006 | Smith | H04W 4/02 |
| | | | 702/3 |
| 2006/0107213 A1 * | 5/2006 | Kumar et al. | 715/700 |
| 2006/0184355 A1 * | 8/2006 | Ballin | G06F 3/011 |
| | | | 704/8 |
| 2006/0199612 A1 * | 9/2006 | Beyer et al. | 455/556.2 |
| 2006/0252530 A1 * | 11/2006 | Oberberger | G07F 17/32 |
| | | | 463/29 |
| 2008/0300780 A1 * | 12/2008 | Domnin | 701/202 |

FOREIGN PATENT DOCUMENTS

| | | |
|---|---|---|
| JP | 2003-067317 A | 3/2003 |
| JP | 2003067317 A | 3/2003 |
| WO | 00/05639 A2 | 2/2000 |
| WO | 01/71472 A2 | 9/2001 |
| WO | WO 01/71472 A2 | 9/2001 |
| WO | WO 02/093352 A1 | 11/2002 |

OTHER PUBLICATIONS

"Digital Publishing—Language Learning at its Best", http://www.digitalpublishing.de/english; Unique features; printed from internet on Jul. 30, 2007.

European Office action for rekated European Patent Application No. 05 708 662.1-1245 dated Feb. 27, 2008, pp. 1-6.

European Office action for related European Patent Application No. 05 708 662.1-1245 dated Apr. 9, 2010, pp. 1-7.

European Office action for related European Patent Application No. 05 708 662.1-1245 dated Mar. 30, 2009, pp. 1-6.

International Preliminary Report on Patentability for related International Patent Application No. PCT/IB2005/000552 dated Sep. 11, 2007, pp. 1-6.

Sayers, et al., "Uable Interfaces for Virtual Environment Applications on Non-immersive Systems", Eurographics UK 2000; Apr. 4, 2000; pp. 143-150.

Office Action for Corresponding Indian Application No. 6076/DELNP/2007 dated Apr. 30, 2015, 2 pages.

* cited by examiner

OFFERING MENU ITEMS TO A USER

CROSS REFERENCE TO RELATED APPLICATIONS

This application is a continuation of U.S. application Ser. No. 11/885,704 filed Sep. 4, 2007, which is the U.S. National Stage of International Application Number PCT/IB05/000552 filed on Mar. 4, 2005 which was published in English on Sep. 8, 2006 under International Publication Number WO 2006/092647, the entireties of which are incorporated herein.

FIELD OF THE INVENTION

The invention relates to an electronic device offering a plurality of menu items to a user. The invention relates equally to a method of offering a plurality of menu items to a user and to a software code supporting an offering a plurality of menu items to a user.

BACKGROUND OF THE INVENTION

Most electronic devices require some kind of interaction with a user for their operation. In order to enable a fast access to a plurality of functions of an electronic device, the functions can often be accessed by means of a menu structure.

A menu structure comprises a plurality of layers, and each layer comprises one or more menu items. Only the menu items of one layer are offered at a time to a user. Each menu item of a current layer offers a certain function to a user. A first type of functions is accessing the menu items of a next layer, which are logically associated to the menu item of the current layer. A second type of functions is controlling the electronic device. The menu items of one layer can be arranged in any suitable form, for example in a list, in a grid structure, or distributed on a desktop in the form of icons, etc.

For a good user experience, the path through the menu structure should be simple and intuitive.

Due to many reasons, such as costs, usefulness etc., many technical devices do not have elaborated graphical user interfaces. Instead, these devices may be controlled remotely. In particular simple technical systems having a simple user interface can benefit from exporting their user interface functionality in a more comprehensive format to a connected electronic device. An example in this category is a printer, which is normally remotely controlled, for example by means of a personal computer (PC).

Mobile terminals are becoming increasingly powerful, and they are available at any time and at any location for a user. Therefore, mobile terminals have the potential to become the primary means of interaction between a user and various technical devices. In view of the increasing number of features that are implemented in mobile terminals themselves, the total number of functions that may be controlled by mobile terminals can thus be expected to become quite extensive.

With an increasing number of functions that are controlled via a single electronic device, an intuitive handling of the menu structure is of particular importance.

SUMMARY OF THE INVENTION

It is an object of the invention to provide a particularly user friendly user interface for an electronic device.

An electronic device offering a plurality of menu items to a user is proposed. The electronic device comprises a screen, user input means, storing means adapted to store parameters for a virtual model of a user and processing means. The processing means are adapted to generate a visual representation of a virtual user model on the screen based on the parameters for the virtual model of a user stored in the storing means. The processing means are further adapted to cause a movement of a visually represented virtual user model depending on a user input via the user input means. The processing means are further adapted to detect a movement of a visually represented virtual user model that is associated to a particular menu item, which is offered for any of a plurality of applications. The processing means are further adapted to call a function that is assigned to the particular menu item.

Moreover, a method for enabling a user to select a menu item offered by an electronic device is proposed. The method comprises generating a visual representation of a virtual user model on a screen of the electronic device, based on stored parameters for a virtual model of a user. The method further comprises causing the visually represented virtual user model to move in accordance with a user input via user input means of the electronic device. The method further comprises detecting a movement of a visually represented virtual user model that is associated to a particular menu item offered by the electronic device for any of a plurality of applications. The method further comprises calling a function that is assigned to the particular menu item.

Moreover, a software code is proposed, which realizes the steps of the proposed method when being run in a processing unit of an electronic device.

Finally, a software program product is proposed, in which such a software code is stored.

The invention proceeds from the consideration that an avatar could be employed for a user interface of an electronic device.

According to Collins English dictionary, an avatar is defined as the visible manifestation or embodiment of an abstract concept. Currently, avatars are only used for dedicated applications. A well known avatar is the paper clip help feature in Microsoft office applications on PCs. More sophisticated help avatars have a more human appearance, which provide a speech output, for example for an interactive computer language course. Another type of avatar is the game character that is controlled by the player of a computer game. In contrast to the help avatar that assists the user, the game avatar represents the user in the game and carries out his or her actions.

In contrast to known avatar based applications, it is proposed that a visually representation of a virtual user model, and thus a user avatar, is provided for enabling a user to explore a menu structure comprising menu items for a plurality of applications. That is, the avatar approach is not restricted to a single application. Even the entire user interface of the electronic device may be avatar based. Menu items can be selected by a user simply by moving the represented virtual user model.

It is an advantage of the invention that a selection of menu items by moving a user avatar is particularly simple and intuitive to a user. In particular in entertainment devices, for example game terminals or rich media devices, using an avatar as well for the managing interactions, like game selection, establishing community services, learning about game news etc., might further be considered to fit better to the rich capabilities of the device than a conventional user interface.

It is to be understood that a menu item may be an item in any form to which some function is associated. The function associated to an item can be for instance presenting another set of menu items, starting an application, calling a particular function of an application, changing settings of an application, establishing a network based communication link to other devices, establishing a data transfer link to other devices, controlling an external device, etc.

Since the use of an avatar provides an abstraction layer for technical features, it is ideally suited for customization and personalization without affecting the technical basis.

In one embodiment of the invention, the storing means are adapted to store at least fixed parameters for a virtual model of a user, which cannot be changed by a user. These fixed parameters may describe in particular the major properties of a user avatar. The set of fixed parameters is also referred to as avatar template. An avatar template may be defined for instance by a manufacturer, by a network operator, if the electronic device is a mobile terminal, or by another third party. An avatar template may contain necessary parametric information about the basic avatar character and/or behavior tendency and about the technical avatar environment, like available resources, including input and/or output means, sensor information, terminal and network specific data etc.

A user might be interested on the other hand in personalizing a user avatar according to his or her own preferences. In one embodiment of the invention, the storing means are therefore adapted to store parameters for a virtual model of a user that are changeable by a user via the user input means. With such changeable parameters, the user is enabled to assign personal properties to his or her own avatar, like own pictures, sounds and preferences. These settings can also be used in an avatar community. If users want to meet for a game on a game server, like in the N-Gage Arena, the properties can be distributed among the involved devices and the customized user avatars can be used to represent their physical counterparts.

Advantageously, an avatar profile is defined, which is always on top of an avatar template. The avatar profile is a collection of changeable and non-changeable parameters, which evolve over time and which define the avatar behavior and capabilities in certain situations. While the template parameters are fixed, the user or other entities, like network operators, can customize the accessible parametric avatar properties of the avatar profile, such as avatar class, skin properties like shape, color, clothing etc. Such an avatar profile thus enables a good compromise between the interests of manufacturers and network operators and the interest of users.

In a further embodiment of the invention, the selectable menu items are visually represented on the screen and the processing means are adapted to detect a movement of a visually represented virtual user model that is associated to a particular menu item, in case the visually represented virtual user model approaches a position on the screen at which the particular menu item is visually represented.

In one embodiment of the invention, the storing means are adapted in addition to store parameters for a virtual model of at least one object representing one of the menu items. For offering a particular menu item to a user, the processing means are adapted to generate a visual representation of a virtual object model, that is, an object avatar, on the screen based on stored parameters for a virtual model of an object representing the menu item.

This is in particular, though not exclusively, of advantage for menu items which enable a control of external devices connected to the electronic device.

In order to facilitate the control of a variety of connected external devices, the required user interaction has to be simple and close to existing user experiences. This can be achieved in particular if the other devices are indicated by a physical object representation in the virtual world, since the users already know the physical object. At least the menu items which are associated to external devices are thus represented advantageously by an own object avatar.

When using avatars as well for objects, for instance for external devices that are to be controlled or for applications within the electronic device, the user interface concept can be translated to interaction concepts of the physical world. These interactions are well known to human beings, and therefore the proposed visualization helps to provide a more intuitive and satisfying user experience. The user interface with its conventional menu structure is thus replaced by a virtual world representation which can be explored by the user using his or her avatar. Decisions in the virtual world are translated into corresponding actions of the real device.

It is not required that the virtual object mirrors every feature and option of a remote device. Rather, it should allow utilizing the main features of the remote device in an intuitive manner. By way of example, object avatars may be used for a remote control of a home stereo system. In the virtual world, the different devices like amplifier, CD/DVD player, radio, TV could be represented by individual avatar objects, which offer their main features like volume control and sound settings, sound source selection and playlist administration.

Virtual object models moreover enable a network operator to introduce own avatars for its services and to guide the user of a communication device accordingly.

In one embodiment of the invention, the storing means are adapted in addition to store parameters for a virtual model of at least one other user of another device, which other user is associated to one of the menu items. For offering a particular menu item that is associated to another user, the processing means are adapted to generate a visual representation of a virtual user model on the screen based on stored parameters for a virtual model of the other user. That is, user avatars for other persons may be provided as well.

The parameters for a virtual model of objects or of other users may also be provided in various ways to the electronic device. They can be downloaded for example via a communication network, be transferred via cable from another user device, for instance from a PC, or be transferred wirelessly from another user device. For instance, when a friend sends his business card information, also his virtual user model parameters may be included. Network operators could also use the download feature to update their service representations.

In order to enable a flexible connection to other devices, either for a control of these other devices or for a communication with a user of these other devices, the storing means are adapted to store a library of templates. Each template comprises parameters for a virtual model of an object or user associated to a possible menu item. The processing means are adapted to generate a visual representation of a virtual object or user model on the screen based on one of the templates stored in the storing means. The template is selected depending on a menu item that is to be offered to a user.

Such a library of templates enables a particularly intuitive operation of various devices, including unknown ones. For the representation of "unknown users", that is, for example of people from a phone book for which so far no dedicated virtual model parameters are stored, a default avatar could be used. Such a default avatar may only state the name of another user as listed in the phone book, until the user of the electronic device defines dedicated parameters or receives dedicated parameters, for instance from the person that is represented or from an internet web-page where such information might be stored, etc.

For each class of avatars, for instance subjects or objects, specific avatar profiles may be defined, which are the basis for the interaction with and the evolution of a particular avatar.

To make avatars work on heterogeneous electronic devices, avatar profiles are represented advantageously in a device-independent, abstract format or language, like the Extended Markup Language (XML). This abstract format or language can then be translated into system-specific formats for lower system-specific layers.

The processing means of the invention, which may provide audiovisual and haptic characteristics of an avatar, may be realized in form of an avatar application, which is located on top of an existing system architecture without avatars. The basic applications, for example a phone application, a calendar application or a camera application, need to be made avatar-aware, that is, they should be able to communicate with the avatar application to provide or receive information. In addition to those interfaces for existing applications, an avatar application could use context information from sensors, other environmental information or server-based information that is provided via a communication network to the electronic device.

In one embodiment of the invention, the electronic device thus comprises at least one sensor, and the processing means are adapted to take measurement data provided by the at least one sensor into account, when generating a visual representation of a virtual user model on the screen. The at least one sensor can be for example a motion sensor, a location sensor, a temperature sensor, a luminance sensor and/or a lightning sensor etc.

The processing means can be adapted to take measurement data provided by the at least one sensor into account for an appearance of the visually represented virtual user model and/or a behavior of the visually represented virtual user model. In addition, it can be taken into account for determining menu items that are currently to be offered and for determining an appearance of an environment in which the visually represented virtual user model is presented on the screen.

The use of context information provided by sensors and/or by a communication network is suited to make the avatar behavior more real. The user experience is the more realistic, the more real environmental information is used for avatar behavior computation.

The required context information can be computed or requested before use. The information may indicate, for example, whether there are objects in the neighborhood of the electronic device that should be displayed on the screen. The context information can also be used to limit the amount of relevant objects in the virtual world, and thus the number of offered options, in order to simplify and speed-up the interaction. The context information may thus be used for providing the electronic device with some kind of intelligence. Server-based information provided via a communication network may also be used to embed real world event information in a calendar of the electronic device and to use an avatar as reminder.

An avatar can also be provided with a knowledge database stored by the storing means. This allows using the avatar as well, for example, as a language dictionary.

If sensor-based information is available in entertainment devices, the information may also be used to adapt avatar behavior and actions in a very natural way to the environment, so that the avatar looks like as part of the environment and not only as a simple entity which is restricted to the terminal.

The electronic device may comprise an operating system, which forwards measurement data provided by at least one sensor to the processing means.

The user input means for moving the avatar can be realized in various ways. It may comprise for instance a touch-screen. In this case, the user simply has to touch a position on the screen to which the avatar is to move. Further, it may comprise direction keys, which allow moving the avatar stepwise in four directions. In addition, many other user input means can be used.

In one embodiment of the invention, a shortcut is defined for enabling a user to perform a movement of the visually represented virtual user model, where the movement is associated to a particular menu item, in a single action by means of the user input means. If approaching a menu item is a movement that is associated to this particular menu item, the shortcut may bring the visually represented virtual user model directly next to the menu item, instead of moving it by small steps using direction keys.

In a further embodiment of the invention, the user input means comprise means, which are arranged to recall a preceding presentation on the screen when being activated by a user, for instance in form of a back key. Such means allow rolling back the physical interaction in the virtual world in case of user errors. Alternatively or in addition, the user input means may comprise means, which are arranged to cause a predefined presentation on the screen when being activated by a user, for instance in form of a home key.

In the following, some exemplary applications of the invention will be presented. If the avatar of the user is handing over a picture album to another avatar in the virtual world, the actual pictures may be sent to the corresponding user in the real world. Further, the electronic device may be represented as a virtual "house", in which the avatar operates. The house is composed of different functionality-related rooms, like a chat room, a news room, a meeting room, a work bench etc. The rooms contain objects, for example furniture etc. The objects finally represent certain functions. Touching an object might, for example, activates a function. User avatars that are associated to other devices, for instance to mobile terminals in the neighborhood, may be displayed in the meeting room. Touching another user avatar might invite the corresponding user to a multiplayer online game or to a chat, etc. The house may further be embedded into a landscape, which is composed of several houses, or other objects. There might be a house that represents the network operator, and the user avatar is invited to enter this house to get into contact with the operator. An avatar can also be moved to the house of another user avatar to knock on the door in order to establish a contact, etc.

The proposed electronic device can be any device which enables a user to select functions via a menu structure, for instance a mobile electronic device. It can be for example, though not exclusively, a mobile communication device like a mobile phone.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
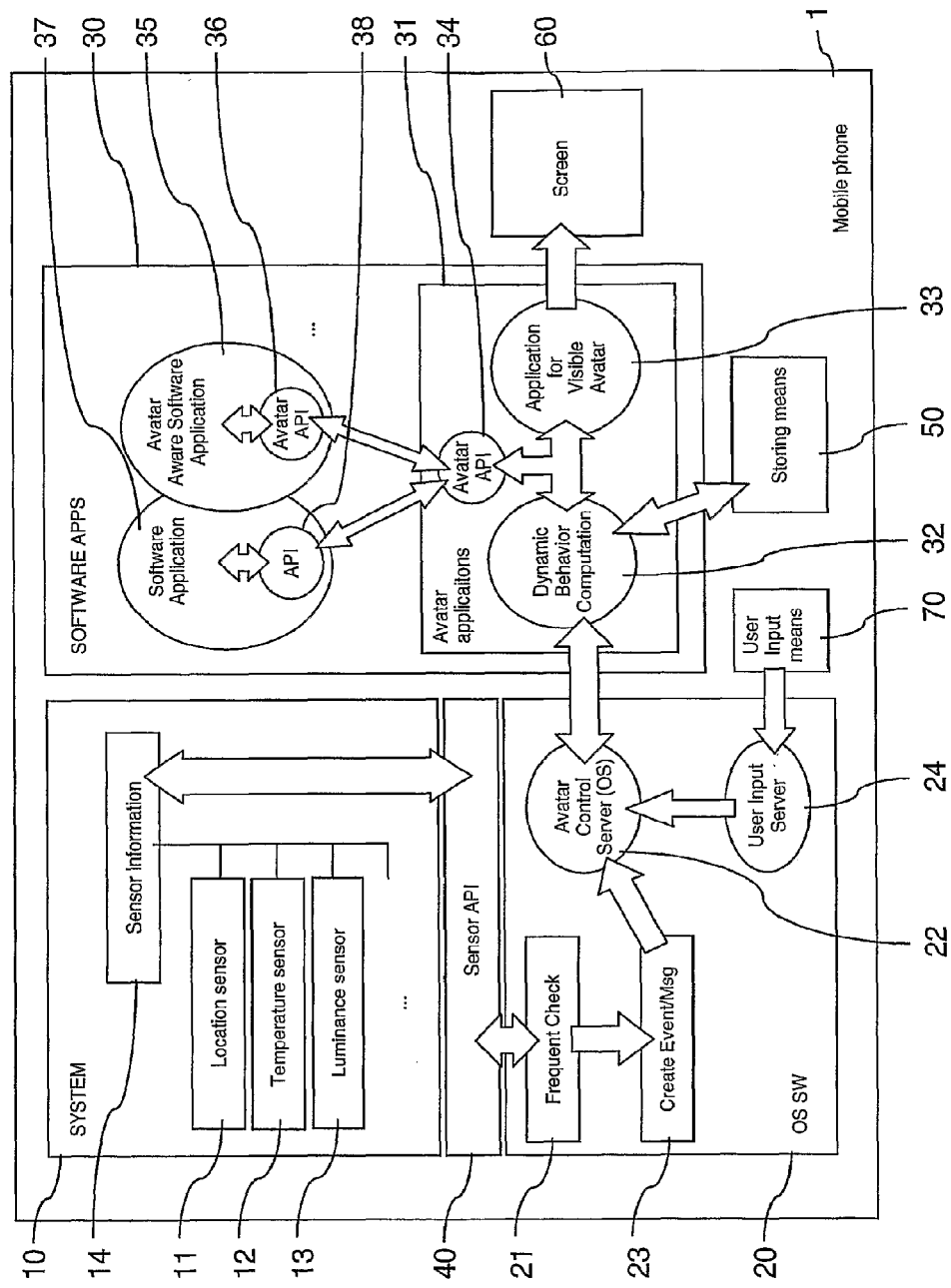
FIG. 1 is a schematic block diagram of an electronic device according to an embodiment of the invention.

FIG. 1 is a schematic block diagram of an electronic device according to an embodiment of the invention, which enables an intuitive user interaction in accordance with the invention.

By way of example, the electronic device is a mobile phone 1. The mobile phone 1 comprises a system portion 10 including hardware components, an operating system portion 20, a software applications portion 30, a terminal-specific sensor API 40, storing means 50 and a user interface, including a screen 60 as well as user input means 70. The user input means 70 may comprise a keypad. Alternatively or in addition, the screen 60 could be a touch-screen and function thus as user input means. The operating system portion 20, the software applications portion 30 and the terminal-specific sensor API 40 comprise software codes that are run by at least one processing unit (not shown) of the mobile phone 1.

The system portion 10 comprises a plurality of sensors, including for example a location sensor 11, a temperature sensor 12 and a luminance sensor 13. The location sensor 11 continuously determines location and motion of the mobile phone 1. The temperature sensor 12 continuously measures the temperature surrounding the mobile phone 1. The luminance sensor 13 continuously measures the luminance surrounding the mobile phone 1. The sensor information 14 provided by these sensors 11, 12, 13 can be accessed via the sensor API 40.

The operating system portion 20 comprises to this end a checking component 21. Further it comprises an avatar control server 22, an event creation component 23 and a user input server 24. The event creation component 23 interconnects the checking component 21 and the avatar control server 22. The user input server 24 interconnects the user input means 70 and the avatar control server 22. The components of the operating system portion 20 are implemented in software.

The checking component 21 checks the information 14 provided by the sensors 11, 12, 13 frequently and automatically. Detected new sensor values cause the event creation component 23 to create a "new sensor values" event or message. This event or message is used for triggering the avatar control server 22 of the operating system portion 20 to update avatar-related parameters, which will be used in the software application portion 30 for a computation or an adaptation of the behavior of an avatar. The user input server 24 may trigger the avatar control server 22 to update avatar-related parameters based on a user input via the user input means 70.

The software application portion 30 comprises avatar applications 31, including a dynamic behavior computation component 32, a visualization component 33 and a general avatar API 34. The software application portion 30 further comprises a plurality of avatar-aware software applications 35 realizing a respective function offered by the mobile phone 1.

The dynamic behavior computation component 32 is able to interact with the avatar control server 22, with the storing means 50, with the visualization component 33 and with the general avatar API 34. The dynamic behavior computation component 32 realizes a service on the terminal application side, which is triggered by the avatar control server 22 every time a sensor value has changed or a user input is detected.

In general, the dynamic behavior computation component 32 is the major software component that makes the avatars "alive", taking account of the information stored in the storing means 50 and the input from the avatar control server 22.

In the storing means 50, at least an avatar user profile is stored, for example in the XML format. The avatar user profile forms the basis for any possible avatar-related action. The avatar user profile also contains all information that may be provided to another device connected to the mobile phone 1, if, for example, the user avatar is to be displayed on a screen of this connected device. The avatar user profile comprises an avatar user template and, optionally, avatar user definitions.

An avatar template guarantees that the interests of the suppliers, like the phone manufacturer and the mobile network operator, are kept. Every avatar template contains device- and/or operator-specific information that is necessary to adapt the terminal-independent avatar definition language to terminal-specific and operator-specific needs. In order to make an avatar work on heterogeneous mobile platforms, the avatar template is in a broader sense the link between an avatar and the system and cannot be modified by the user. The avatar template contains information about technical capabilities, for example about supported sensors, and network-related information, for example server connection information. Further, it contains major avatar-related information, for example behavior patterns, basic avatar characteristics like a representation as a 2D or a 3D graphics model, artificial intelligence parameters, etc.

An avatar template is mandatory to make an avatar work on heterogeneous mobile platforms. A set of pre-installed avatar templates might already be installed by the phone manufacturer. Also the network operator could pre-install avatar templates. Optionally, avatar templates can be installed any time, so that downloads of avatar templates, which may include for instance advanced capabilities, are possible.

An avatar user profile provides in addition the opportunity to adapt a user avatar, which is mainly predefined by an avatar user template, to personal user-based preferences. If a certain avatar capability or property is parameterized, the degree of a possible personalization, for example the allowed range of parameters, is also defined by the avatar user template. User definitions in the avatar user profile may relate to appearance details of the user avatar, for instance skin details like coloring, clothing, etc. User definitions in the avatar user profile may further include other detailed avatar-related information, like behavior details. A user definition may define for instance whether the avatar appears friendly or very friendly, active or passive, etc. Further, a user definition may define an avatar name, etc. Avatar user definitions may also define the intensity of interactions, that is, how frequently the user avatar initiates an interaction with the user or how autonomously it is acting.

In addition to a user avatar profile, a library of avatar object templates may be stored, for example for the users of other devices, for objects of the real world with which the mobile phone 1 may interact and for available functions provided by the software applications 35. An object avatar can be generated, for example, by taking several pictures of an object to build 360° view and by morphing them onto the avatar surface. User definitions for a user profile can also be used for customizing avatar object templates in the object library by setting audio-visual and haptic properties.

As indicated above, avatar user definitions are optional, so that already avatar templates enable "living" avatars on a certain system, because an avatar profile is always built on top of an avatar template.

Proceeding from the stored avatar profiles, the dynamic behavior computation component 32 manages the avatar stage. It has full control over the evolution of a user avatar, such as, for example, an increasing intelligence, changing behavior tendencies due to user habits, etc. Further, it takes care of a behavior adaptation in response to an input changing over time. Such input may be input from the sensors 11, 12, 13, input from a local environment including for instance devices in the neighborhood of the mobile phone 1, and input from a network operator, which may include reminders, advertisements for events, etc.

The service rendered by the dynamic behavior computation component 32 does not have any direct visible effects on the screen 60. The avatar visualization on the screen 60 is rather performed by a separate visualization component 33 that is communicating with the dynamic behavior computation component 32, and vice versa. The visualization component 33 presents the user avatar, which can be controlled by a user via the user input means, and objects which have functions and means for being accessed as in the real world. The visualization component 33 thus presents a virtual world model enabling user interactions with a physical environment, for instance with other users or with technical devices.

The general avatar API 34 can be used to exchange messages between all avatar-relevant entities so that already a simple message passing system enables an efficient avatar related communication. The general avatar API 34 enables in particular the avatar-aware software applications 35 on the software application side to communicate with the visualization component 33 as well as with the avatar behavior computation component 32.

The avatar-aware software applications 35 and services differ from standard software applications by exposing an own avatar API 36, which enables a remote control of these software applications 35 by the avatar applications 31. Avatar-aware software applications export basic events, for instance an incoming call notification plus the associated phone number. They import basic events, for instance to establish a call to a specified phone number. They allow a query for information, for instance in the phonebook, in the calendar and in messaging applications. They also allow storing information from a remote control application, in the present embodiment from the avatar applications 31. In addition to their normal user interface appearance they can be operated in a remote control mode without showing their own user interface. Moreover, they can be commanded via the avatar API 36 to release or use certain resources, like displays, speakers, keypad, etc. They can be started or stopped via an external control. Avatar-aware software applications 35 can be implemented as server modules by extending existing applications. Their data exchange can be realized for example via messaging queues or file I/O. It has to be noted that the mobile phone 1 may comprise conventional software applications 37 as well. These may offer their normal API 38 to the avatar API 34. Towards the normal API, the avatar API 34 may act like a conventional user interface. Compared to a conventional API 38, the avatar API 36 of an avatar-aware software application 35 may be designed to support additional avatar related functions, though.

Figure 2:
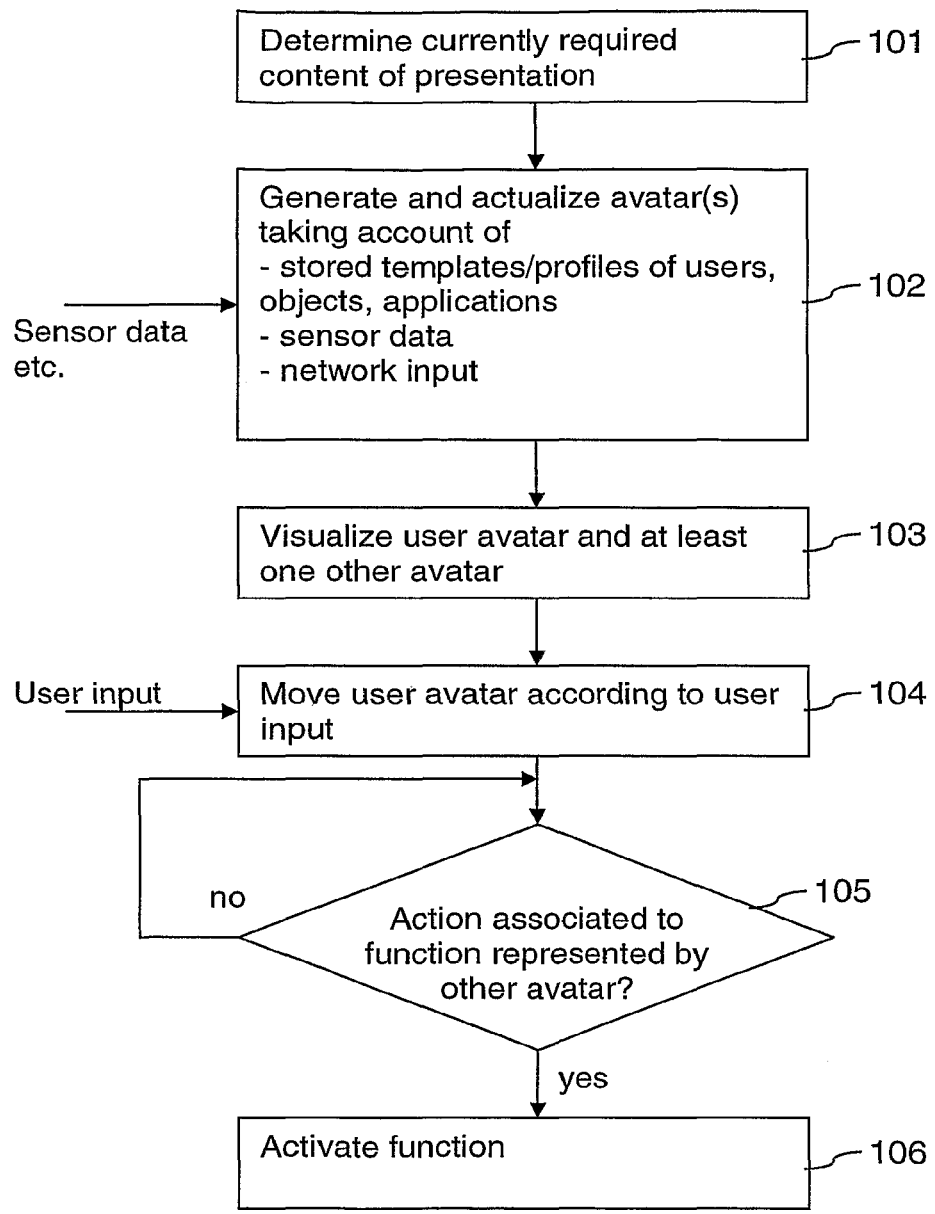
FIG. 2 is a flow chart illustrating an operation in the electronic device of FIG. 1.
Figure 3:
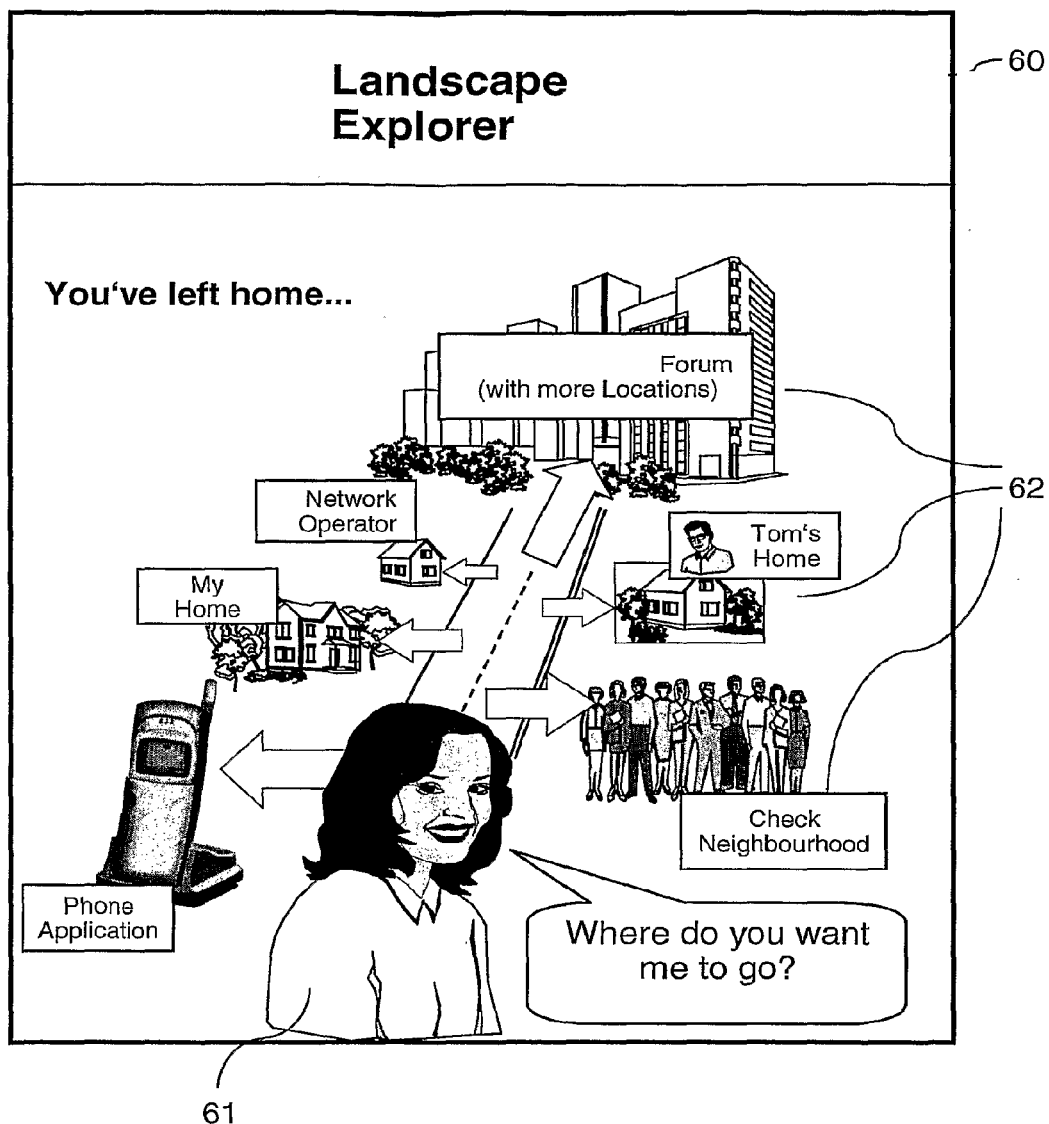
FIG. 3 is a diagram illustrating a possible presentation on a screen of the electronic device of FIG. 1.

The avatar-related operation in the mobile phone 1 will now be explained with reference to FIGS. 2 and 3. FIG. 2 is a flow chart illustrating the operation in the mobile phone 1, while FIG. 3 is an exemplary representation on a screen 60 of the mobile phone 1.

The visualization component 33 manages a menu structure comprising a plurality of menu items (step 101). It informs the dynamic behavior computation component 32 about the menu items of the menu structure that are currently to be presented to a user. The menu items of the highest layer or layers of the menu structure may be defined in the visualization component 33 itself, while the menu items of deeper layers may be provided by a respective software application 35, 37 by which the menu items are offered.

The dynamic behavior computation component 32 fetches the XML avatar user profile from the storing 50 and translates it into a system-specific format for lower system-specific layers. The dynamic behavior computation component 32 equally fetches and translates avatar object templates for the indicated menu items from the storing means 50. Based on the information, the dynamic behavior computation component 32 generates a user avatar and object avatars with the defined characteristics. (step 102)

The visualization component 33 then visualizes the generated avatars on the screen 60 of the mobile phone 1 in an environment predefined for the current menu layer (step 103). Conventional menu items are thus mapped to one or more objects in a virtual world. It has to be noted that the environment for a particular menu layer could also be based on an avatar template stored in the storing means 50.

An example of such a visualization by the visualization component 33 is depicted in FIG. 3.

Here, a landscape is depicted, in which several menu items in the form of a respective object avatar 62 are arranged along a street. The menu items include object avatars 62 for a phone application, for checking the neighborhood, for home, for 'Tom's home' enabling a contact with another device belonging to Tom, for the network operator, and for a forum providing access to other menu items. In addition, the user avatar 61 is presented.

Browsing the menu is mapped to walking along the street and encountering objects in the virtual avatar world. Menu selection in a standard user interface is replaced by taking certain routes in the avatar world. The user avatar 61 invites the real user to interact with an object by approaching the corresponding object avatar 62, for example stepwise along the road by means of direction keys. Shortcuts may be defined for enabling a fast avatar control, for example by jumping directly to a certain object avatar 62.

The user may move the user avatar 61 using the user input means 70. The user input means 70 indicate the user input via the user input server 24 and the avatar control server 22 to the dynamic behavior computation component 32. The dynamic behavior computation component 32 takes care of the respective update of the user avatar position on the screen 60 via the visualization component 33. The dynamic behavior computation component 32 further checks whether the position of a presented object avatar 62 is reached to which a certain function is associated (step 105).

If this is the case, the dynamic behavior computation component 32 activates this function via the general avatar API 34 and the specific avatar API 36 or the conventional API 38, respectively, of the application 35, 37 which is responsible for the selected function (step 106).

If a called function requires a presentation of other options to a user (step 101), the presentation on the screen 60 is then updated by the dynamic behavior computation component 32 and the visualization component 33 with new object avatars, possibly with another predetermined environment (steps 102, 103).

For example, if the user moved the user avatar 61 of FIG. 3 to the object avatar 62 for checking the neighborhood, a new presentation might show a meeting room in which object avatars representing other users are assembled which are available for a chat, an online network game, etc. The other users may be, for instance, any other users for whom contact information is available in the mobile phone 1 and who are located at a distance of up to one mile to the mobile phone 1. A neighborhood checking function of a software application 35, 37 that is called when the user avatar 61 approaches the check neighborhood avatar 62 may inquire such users from a mobile communication network. The user may be invited by the user avatar 61 to contact any of the other users which are represented by a respective object avatar, in the case of a touch screen for instance simply by tapping onto the corresponding object avatar on the screen 60.

If the user moved the user avatar 61 of FIG. 3 to the object avatar 62 for the telephone application, a new presentation might show folders representing various contacts in a phone-book of the mobile phone 1. The user may be invited by the user avatar 61 to select one of the folders for establishing a connection.

Approaching the other object avatars 62 of FIG. 3 with the user avatar 61 will result in a similar update of the presentation on the screen 60.

In case the called function is an avatar-aware game application, the user avatar can also be integrated into the game. In that case, the boundary between game and user interface is vanishing. The game could then also provide information to other applications 35, 37 like booking certain appointments in the calendar for gaming challenges.

Meanwhile, the dynamic behavior computation component 32 checks as well sensor based triggers by the avatar control server 22.

For example, if the user does not move the user avatar for a while, the dynamic behavior computation component 32 might cause the user avatar to 'go to sleep', that is, cause the visualization component 33 to represent a sleeping user avatar on the screen 60. If the location sensor 11 senses that the mobile phone 1 is shaken, the checking component 21 will detect a corresponding information via the sensor API 40 and cause the event creation component 23 to create a corresponding message for the avatar control server 22. The avatar control server 22 then triggers the dynamic behavior computation component 32 to 'wake-up' the user avatar.

In another example, the checking component 21 checks via the sensor API 40 temperature information provided by the temperature sensor 12. If the detected temperature exceeds a predetermined threshold, the event creation component 23 creates a warning event for the avatar control server 22. The avatar control server 22 then triggers the dynamic behavior computation component 32 to generate a user avatar which informs the user about a critical temperature for the mobile phone 1 when presented on the screen 60 by the visualization component 33.

In another example, a location service may be selected by a user. In the example of FIG. 3, such a location service might be offered after the user avatar has approached the object avatar 62 for the forum. In this case, the dynamic behavior computation component 32 may consider location information determined by the location sensor 11 and provided via the checking component 21, the event creation component 23 and the avatar control server 22. Depending on the current location and orientation, the dynamic behavior computation component 32 may create for example an object avatar representing road signs indicating which points of interest can be found in which direction.

The dynamic behavior computation component 32 can also be adapted to learn about the physical environment via context information. Sensor information and other context information channels may be analyzed for what is available in the current context. Only for the relevant applications or devices in the real world object avatars are then created in the virtual world.

A mobile phone 1 may distinguish, for example, a home environment reliably from other places by its position, which may be derived from information provided by a GPS receiver. Based on previous experiences, the mobile phone 1 is aware of electronic devices at home that are suited for an interaction. Only when being at home, the avatar applications 31 create and present a virtual home environment, in which all electronic devices of interest are represented by object avatars together with the user avatar. In this case, a presented object avatar may be provided with virtual remote control functions that can be handled by the user avatar, for example, remote control for a home stereo system.

A help avatar may always be generated and presented by the avatar applications 31 to provide context-sensitive help. Such a help avatar may for example step in automatically when the reaction time for a certain action exceeds a predetermined limit.

The user input means 70 comprise a dedicated "back" key and a dedicated "home" key (not shown). When a user presses the "back" key, the last action in the virtual world is reversed and the previous state restored. When the user presses the "home" key, the user avatar is brought directly back to a starting point. The starting point can be for example the representation of a main application, in which the user avatar can either focus on the internal functionalities of the mobile phone 1, for instance make a game selection, or jump out of the mobile phone 1 to interact with other users via their avatars. It is to be understood that also in these cases, the information about a user input is provided by the user input means 70 via the user input server 24 and the avatar control server 22 to the dynamic behavior computation, which then causes a corresponding update of the presentation on the screen 60 by the visualization component 33.

It should be noted that it is not required that other people also have avatar-equipped devices for enabling a generation and presentation of object avatars for other users, since their representations are generated in the mobile phone 1. In case the other persons are not contributing to the avatar properties, they are presented based on default avatar values as defined by a template in the storing means 50.

Summarized, the presented mobile phone 1 has an intuitive avatar-based user interface. Avatars become an integral part of the mobile phone 1, which provides interfaces to the real physical environment, for example via sensors or received network information, as well as interfaces to internal system components, like avatar-aware software applications and operating system modules.

It is to be noted that the described embodiment constitutes only one of a variety of possible embodiments of the invention.

The invention claimed is:

1. An apparatus comprising:
   at least one sensor;
   at least one processor; and
   at least one memory including computer program code for one or more programs, the at least one memory and the computer program code configured to, with the at least one processor, cause the apparatus to perform at least the following,
   determine measurement data from the at least one sensor of the apparatus;
   cause, at least in part, a generation of a visual representation of a virtual model of a user of the apparatus based in part on the measurement data from the at least one sensor;
   cause, at least in part, a generation of a visual representation of a virtual model of at least one object; and
   cause, at least in part, a movement of the visually represented virtual model depending on an input by the user of the apparatus,
   wherein the apparatus, or the virtual model of the user, interacts with the at least one object virtual model,
   wherein the visual representation of the virtual model of the user and the visual representation of the virtual model of the at least one object are defined using a terminal-independent avatar definition language, and
   wherein a first avatar profile for the visual representation of the virtual model of the user and a second avatar profile for the visual representation of the virtual model of the at least one object contain device-specific information to adapt the terminal-independent avatar definition language to a specific terminal.

2. The apparatus of claim 1, wherein the apparatus is further caused to:
   store parameters for the virtual model of the user of the apparatus and for a virtual model of at least one user of another device that is associated with a menu item offered to the user of the apparatus.

3. The apparatus of claim 2, wherein the generation of the visual representation of the virtual model of the user of the apparatus is based in part on the respective parameters.

4. The apparatus of claim 2, wherein the apparatus is further caused to cause, at least in part, a generation of a visual representation of a virtual model of the at least one user of another device based on the respective parameters.

5. The apparatus of claim 4, wherein the apparatus is further caused to:
   cause, at least in part, a detection of a movement, of the visually represented virtual model that is associated with the menu item, which menu item is offered for any of a plurality of applications; and
   call a function that is assigned to the menu item.

6. The apparatus of claim 4, further comprising a screen, wherein a plurality of menu items are visually represented on the screen and wherein the apparatus is further caused to:
   cause, at least in part, a detection of the movement of the visually represented virtual model that is associated with a menu item in case the visually represented virtual model approaches a position on the screen at which the menu item is visually represented.

7. The apparatus of claim 1, wherein the at least one sensor includes a location sensor, and the apparatus is further caused to determine the measurement data provided by the at least one sensor including the location sensor into account for at least one of an appearance of the visually represented virtual model, a behavior of the virtual model of the visually represented virtual model, a selection of currently offered menu items and an appearance of an environment in which the visually represented virtual model is presented.

8. A method comprising:
   determining measurement data from at least one sensor of an apparatus;
   causing, at least in part, a generation of a visual representation of a virtual model of a user of the apparatus based in part on the measurement data from the at least one sensor;
   causing, at least in part, a generation of a visual representation of a virtual model of at least one object; and
   causing, at least in part, a movement of the visually represented virtual model depending on an input by the user of the apparatus,
   wherein the apparatus, or the virtual model of the user, interacts with the at least one object virtual model,
   wherein the visual representation of the virtual model of the user and the visual representation of the virtual model of the at least one object are defined using a terminal-independent avatar definition language, and
   wherein a first avatar profile for the visual representation of the virtual model of the user and a second avatar profile for the visual representation of the virtual model of the at least one object contain device-specific information to adapt the terminal-independent avatar definition language to a specific terminal.

9. The method of claim 8, further comprising storing parameters for the virtual model of the user of the apparatus and for a virtual model of at least one user of another device that is associated with a menu item offered to the user of the apparatus.

10. The method of claim 9, wherein the generation of the visual representation of the virtual model of the user of the apparatus is based in part on the respective parameters.

11. The method of claim 9, further comprising causing, at least in part, a generation of a visual representation of a virtual model of the at least one user of another device based on the respective parameters.

12. The method of claim 11, further comprising:
    causing, at least in part, a detection of a movement, of the visually represented virtual model that is associated with the menu item, which menu item is offered for any of a plurality of applications; and
    calling a function that is assigned to the menu item.

13. The method of claim 11, further comprising causing, at least in part, a detection of the movement of the visually represented virtual model that is associated with a menu item in case the visually represented virtual model approaches a position on a screen of the apparatus at which the menu item is visually represented, wherein a plurality of menu items are visually represented on the screen.

14. The method of claim 8, further comprising:
    taking the measurement data provided by the at least one sensor into account for at least one of an appearance of the visually represented virtual model, a behavior of the virtual model of the visually represented virtual model, a selection of currently offered menu items and an appearance of an environment in which the visually represented virtual model is presented; wherein the at least one sensor includes a location sensor and the apparatus is a mobile terminal.

15. A method of claim 8, wherein the first avatar profile and the second avatar profile contain information about technical capabilities, network-related information, or a combination thereof for respectively generating the visual representation of the virtual model of the user and the visual representation of the virtual model of the at least one object.

16. A non-transitory computer-readable storage medium carrying one or more sequences of one or more instructions which, when executed by one or more processors, cause an apparatus to perform at least the following:
- determining measurement data from at least one sensor of an apparatus;
- causing, at least in part, a generation of a visual representation of a virtual model of a user of the apparatus based in part on the measurement data from the at least one sensor;
- causing, at least in part, a generation of a visual representation of a virtual model of at least one object; and
- causing, at least in part, a movement of the visually represented virtual model depending on an input by the user of the apparatus,
- wherein the apparatus, or the virtual model of the user, interacts with the at least one object virtual model,
- wherein the visual representation of the virtual model of the user and the visual representation of the virtual model of the at least one object are defined using a terminal-independent avatar definition language, and
- wherein a first avatar profile for the visual representation of the virtual model of the user and a second avatar profile for the visual representation of the virtual model of the at least one object contain device-specific information to adapt the terminal-independent avatar definition language to a specific terminal.

17. The non-transitory computer-readable storage medium of claim 16, wherein the apparatus is caused to further perform storing parameters for the virtual model of the user of the apparatus and for a virtual model of at least one user of another device that is associated with a menu item offered to the user of the apparatus.

18. The non-transitory computer-readable storage medium of claim 17, wherein the generation of the visual representation of the virtual model of the user of the apparatus is based in part on the respective parameters.

19. The non-transitory computer-readable storage medium of claim 17, wherein the apparatus is caused, at least in part, to further perform:
- causing, at least in part, a generation of a visual representation of a virtual model of the at least one user of another device based on the respective parameters;
- causing, at least in part, a detection of a movement, of the visually represented virtual model that is associated to the menu item, which menu item is offered for any of a plurality of applications; and
- calling a function that is assigned to the menu item.

20. The non-transitory computer-readable storage medium of claim 16, wherein the apparatus is caused, at least in part, to further perform:
- taking the measurement data provided by the at least one sensor into account for at least one of an appearance of the visually represented virtual model, a behavior of the virtual model of the visually represented virtual model, a selection of currently offered menu items and an appearance of an environment in which the visually represented virtual model is presented; and
- wherein the at least one sensor includes a location sensor and the apparatus is a mobile terminal.

* * * * *